United States Patent
Day et al.

(10) Patent No.: US 7,736,787 B2
(45) Date of Patent: Jun. 15, 2010

(54) CERAMIC MEMBRANES WITH INTEGRAL SEALS AND SUPPORT, AND ELECTROCHEMICAL CELLS AND ELECTROCHEMICAL CELL STACKS INCLUDING THE SAME

(75) Inventors: Michael J. Day, Dublin, OH (US); J. Michael Funk, Glouster, OH (US); Todd G. Lesousky, Columbus, OH (US); Matthew M. Seabaugh, Columbus, OH (US)

(73) Assignee: NexTech Materials, Ltd., Lewis Center, OH (US)

( * ) Notice: Subject to any disclaimer, the term of this patent is extended or adjusted under 35 U.S.C. 154(b) by 1009 days.

(21) Appl. No.: 11/220,361

(22) Filed: Sep. 6, 2005

(65) Prior Publication Data

US 2007/0054169 A1    Mar. 8, 2007

(51) Int. Cl.
*H01M 2/08* (2006.01)
*H01M 8/10* (2006.01)
(52) U.S. Cl. .............................. 429/35; 429/30; 429/32
(58) Field of Classification Search .................. 429/30, 429/32, 35
See application file for complete search history.

(56) References Cited

U.S. PATENT DOCUMENTS

| | | | |
|---|---|---|---|
| 3,336,629 A | 8/1967 | Matsui | |
| 5,238,754 A | 8/1993 | Tasuo et al. | |
| 5,866,275 A | * 2/1999 | Kawasaki et al. | ............. 429/30 |
| 6,428,920 B1 | 8/2002 | Badding et al. | |
| 2002/0076593 A1 | 6/2002 | Helfinstine et al. | |
| 2002/0127455 A1 | 9/2002 | Pham et al. | |
| 2003/0035989 A1 | 2/2003 | Gorte et al. | |
| 2003/0059668 A1 | 3/2003 | Visco et al. | |
| 2004/0023101 A1 | 2/2004 | Jacobson et al. | |
| 2004/0115503 A1 | 6/2004 | Jacobson et al. | |
| 2005/0227133 A1 | 10/2005 | Gorte et al. | |
| 2006/0113034 A1 | 6/2006 | Seabaugh et al. | |
| 2006/0234100 A1 | 10/2006 | Day et al. | |

FOREIGN PATENT DOCUMENTS

JP    6-68885    * 3/1994

OTHER PUBLICATIONS

Day et al, U.S. Appl. No. 11/109,471, as cited as above as Publication No. 20060234100 A1, Oct. 19, 2006.

* cited by examiner

*Primary Examiner*—Patrick Ryan
*Assistant Examiner*—Thomas H. Parsons
(74) *Attorney, Agent, or Firm*—Porter Wright Morris & Arthur LLP

(57) ABSTRACT

Ceramic membranes with integral seals and support, and related electrochemical cells and cell stacks. The membrane comprises a thin electrolyte layer supported on a porous electrode layer which in turn is supported on a thick ceramic support layer, preferably a ceramic electrolyte support. The support layer is divided into a plurality of self-supporting thin membrane regions by a network of thicker integrated support ribs. The thin electrolyte layer and thick ceramic support layer preferably define a sealing perimeter surrounding the porous electrode layer.

18 Claims, 10 Drawing Sheets

Step 1

Step 2

Step 3

Step 4

⊢⊣ 1.00 cm 1.00 cm 1.00 cm

CERAMIC MEMBRANES WITH INTEGRAL SEALS AND SUPPORT, AND ELECTROCHEMICAL CELLS AND ELECTROCHEMICAL CELL STACKS INCLUDING THE SAME

CROSS-REFERENCE TO RELATED APPLICATIONS

Not applicable

STATEMENT REGARDING FEDERALLY SPONSORED RESEARCH

Not applicable

REFERENCE TO MICROFICHE APPENDIX

Not applicable

FIELD OF THE INVENTION

The invention relates to thin film membranes of ceramic materials with integral seals and support, electrochemical cells including these membranes, and stacks formed from these electrochemical cells. The disclosed membrane and resultant cell and stack architecture are particularly well suited to applications in which mechanical ruggedness and volumetric and gravimetric reaction density are desirable. This invention may be useful in electrochemical separations and catalytic reactors including but not limited to solid oxide fuel cells and oxygen separation membranes.

BACKGROUND OF THE INVENTION

Tubular solid oxide fuel cells (SOFCs) are the most extensively demonstrated of the many designs proposed for SOFCs. In these structures, a multi-layer tube is fabricated with cathode, electrolyte, and anode layers. Tubes that are supported by anodes, cathodes, and electrolytes each have been proposed in the literature and demonstrated. Electrolyte- and cathode-supported tubes, in both circular and flat tube configurations, have been demonstrated by Westinghouse and Siemens-Westinghouse Power Corporation. Anode-supported tubes have been demonstrated by a range of manufacturers.

In tubular SOFCs, fuel or air is flowed down the center of the tube, depending on whether the tube is anode- or cathode-supported, while the complementary gas mix is flowed outside the tube. Such tubes can have open or closed ends and are typically sealed outside the reaction zone of the SOFC. Conventional tubular cells typically suffer from low volumetric or gravimetric power density because large tubes do not pack well and have a low surface area to volume ratio.

Microtubular SOFCs, in which small-diameter (i.e., <5 mm) tubes of electrolyte are slurry coated with cathode and anode components, overcome some of the disadvantages of conventional tubes. Sealing of small diameter microtubes is simpler than sealing of conventional tubes. Microtubular cells also overcome the low surface area to volume ratio associated with conventional tubular cells. However, microtubular cells require complex manifolding and electrical interconnection schemes, which makes scaling to large power stacks difficult.

Planar SOFCs, which may be supported by either the electrode or the electrolyte, also have been demonstrated extensively. Electrode-supported cells have a thick electrode component that acts as the mechanical load-bearing member of the cell and a thin electrolyte layer. This design reduces electrolyte ohmic resistance in the cell and allows operation at intermediate temperatures (e.g., T<800° C.). Electrode-supported SOFCs typically are produced by co-sintering the support electrode material and a thin coating of electrolyte material. The electrode support is typically tape cast, calendared, or slip cast, although other preparation methods have been demonstrated. The thin electrolyte can be deposited in a number of ways, including but not limited to lamination of electrolyte tape, screen printing, calendaring, and spray deposition. Electrode-supported cells preferably have an electrolyte that is less than twenty microns in thickness after sintering and well-adhered to the electrode support.

Electrode-supported planar SOFCs include both cathode- and anode-supported cells. Cathode-supported cells have the potential to be lightweight and lower in cost than anode-supported cells. However, processing of cathode-supported cells is difficult because the co-firing of most cathode materials in contact with an electrolyte produces insulating intermediate compounds. Anode-supported electrolytes are perhaps the most widely evaluated cell geometry for low temperature operation. Processing of anode-supported cells is comparatively easy because sintering temperatures in excess of 1300° C. can be used to achieve dense electrolytes without concern for interaction between the anode material and the supported electrolyte.

Planar anode-supported cells are particularly attractive for mass market, cost driven applications because of their high areal power density and their advantageous packing efficiency. Performance of anode-supported cells at 700° C. has been demonstrated to be over 1 W/cm$^2$ in small cells at low fuel utilization. With appropriate seal and interconnect technology, power densities greater than 0.4 W/cm$^2$ have been reported for anode-supported cell stacks. However, anode-supported cells are not without drawbacks. When conventional nickel oxide/yttrium-stabilized zirconia (NiO/YSZ) composites are used as support materials, the reduction of NiO to nickel metal creates stress in the electrolyte layer, which may cause considerable deformation during this reduction process. Operating planar anode-supported cells at high power density and high fuel utilization also is difficult; the thick porous layer prevents rapid diffusion of steam away from the electrolyte and results in increased cell area-specific resistance (ASR) at high current density.

Electrolyte-supported planar cells have an electrolyte layer that provides the mechanical strength of the cell. The electrolyte layer can be produced by tape casting or other methods. Electrodes typically are deposited on the electrolyte layer by screen printing or spray coating and fired in a second step. To achieve strong electrode adhesion, the ink particle size, composition, and surface area must be tailored to the target firing temperature and controlled during fabrication. Electrodes can be sintered in two separate steps or simultaneously, depending upon the requisite temperatures for the cathode and anode. In many cases, the anode ink is fired first because it is more refractory and more difficult to sinter, and the cathode ink is applied and fired in a second step at a lower temperature to minimize the chemical interaction between the electrolyte and cathode.

Electrolyte-supported cells offer numerous advantages in the production of SOFCs. The sealing of electrolyte-supported cells is simpler than electrode-supported planar cells because a dense electrolyte perimeter can be preserved during cell processing, which provides a dense, smooth surface for sealing operations. Electrolyte-supported cells also have good stability during reduction. Because only a thin layer of anode ink is affected by the reduction process, this process generally has little impact on cell mechanical stability. The gas diffusion path in and out of the thinner anode layer is short, making fuel and steam diffusion limitations less of a concern.

However, under identical operating conditions, electrolyte-supported cells often exhibit much higher area-specific resistance values than electrode-supported cells because the electrolyte is more resistive than the anode or cathode materials. To compensate for this higher area-specific resistance, the operating temperature for electrolyte-supported cells generally is higher than anode-supported cells using the same materials set. The higher operating temperature of the electrolyte-supported cells can be a drawback, particularly for developers wishing to use metallic interconnect materials.

In spite of more than thirty years of continuous research in the area of SOFCs, these systems remain far from commercialization. Until SOFC cells are developed that address the shortcomings of existing cell structures, it will be difficult for SOFCs to overcome the commercialization barriers and compete with conventional energy production routes. Considering planar cells in particular, a cell that delivers high performance, high mechanical strength, and easier sealing than current electrolyte- or anode-supported cells is essential in advancing commercialization of SOFCs.

SUMMARY OF THE INVENTION

The present invention provides a mechanically robust supported ceramic membrane structure. This structure provides the advantages of both electrolyte-supported cells (a dense sealing perimeter, high mechanical strength, and thin electrode layers that avoid diffusion limitation of performance) and electrode-supported cells (low ohmic contribution of the electrolyte layer and the potential for low temperature operation) without the drawbacks of these conventional cells. The structure is useful in the fabrication of electrochemical cells; when appropriate electrode materials are selected, the cell may be used as a fuel cell, oxygen separator, or other electrochemical device.

The structure comprises a very thin electrolyte (less than 50 microns) supported by a thin layer of a porous electrode material (less than 100 microns). The two layers form a thin membrane reactor that is supported by a mesh-like mechanical support layer. The membrane structure of the present invention may be prepared by laminating a thin electrolyte layer in the green state with an electrode layer in the green state. The mechanical support may be attached by laminating a third, thicker ceramic layer to the bi-layer, also in the green state. This mechanical support has been preformed to provide a meshed network of support ribs.

Preferably, the thin electrolyte layer and ceramic support layer extend radially outwardly beyond the perimeter of the electrode layer to form a dense sealing perimeter. This sealing perimeter encapsulates the electrode layer. The electrode layer is sintered to the adjacent surfaces of the thin electrolyte and ceramic support layers within the interior of the structure and does not extend to the outer surface of the structure. The dense sealing perimeter formed by the thin electrolyte layer and the ceramic support layer is particularly well suited for stack fabrication.

The thin electrolyte layer may be prepared by tape casting or other processes that result in a layer having a thickness of less than 50 microns after firing. The electrode layer may be prepared by tape casting or other processes that result in a layer having a thickness of less than 100 microns after firing. The electrode layer preferably is porous. The electrode material may be porous; alternatively, the electrode material in the green state may contain a fugitive material, resulting in pore formation upon sintering of the electrode layer. The thicker support layers may be produced by punching or cutting green sheets produced by tape casting; by conventional casting methods including but not limited to slip casting or gel casting; by dry or semi-dry pressing using isostatic or uniaxial presses; or by printing the pattern by solid freeform fabrication or similar high solids extrusion processes. Thin layers of ceramic can also be laminated in the green state to form thicker support layers.

The preferred method for lamination, described herein, is the use of pressure and temperature to bond the three layers by heating the green ceramic tape above the glass transition temperature of the polymer component to achieve intimate contact and bonding between the layers. The electrolyte, electrode and support layers are compressed at temperatures below 100° C. to produce a laminate structure. The laminates are subsequently heated to 600° C. to remove the polymeric binder. The resultant structures are sintered at temperatures above 1000° C. to densify the structure and provide adherence and cohesion between layers.

The architecture of electrochemical cells including the ceramic membranes of the present invention offer significant advantages in processing, electrochemical performance, mechanical integrity, the sealing of stacks, and the facility of gas flow compared to electrode-supported cells. This architecture also provides a means of translating the advantages of thin electrolytes to a robust electrolyte-supported structure.

The planar structure of the present invention also provides a flexible platform for a range of electrochemical cells by the selection of appropriate electrode layers (either anode or cathode layers can be considered for the porous layer) and corresponding vehicles such as screen printing inks. The simple planar geometry of the cell also allows the use of existing electrode materials and processes developed for both electrode- and electrolyte-supported cells. The membranes and cells of the present invention are particularly well-suited to large volume manufacturing and low cost processes.

The mesh-like mechanical support creates a macroscopic texture on at least one side of the disclosed cells and, together with the electrolyte layer, serves to encapsulate the edges of the electrode layer. In the disclosed examples, the anode layer is encapsulated on this textured side of the structure and the cathode is deposited on the opposing side. Conceptually equivalent cells could be produced in which the cathode layer supports the electrolyte and is encapsulated by the electrolyte and support, while the anode layer is deposited on the untextured side of the cell.

The dense seal perimeter of the present invention is particularly well suited for stack fabrication. Fuel cell stacks can be produced by interleaving electrochemical cells formed using disclosed structure with dense interconnect plates. The interconnect plates separate the air and fuel streams while providing an electrical series connection between the cells. The strength and flexibility of the proposed membrane structure allows the resultant cells to achieve cell-to interconnect conformance during stack assembly by applying small compressive forces; good contact along the perimeter improves stack sealing while good area contact between the cells and the interconnect reduces stack resistance.

In one embodiment, the invention provides a ceramic membrane comprising a thin ceramic electrolyte layer, an intermediate porous electrode layer supporting the thin ceramic electrolyte layer, and a thick ceramic layer supporting the intermediate layer; the ceramic support layer defines a plurality of voids separated by a network of support ribs. The thin electrolyte layer and the ceramic support layer each may extend radially outwardly beyond the perimeter of the porous electrode layer to define a sealing perimeter that encapsulates the porous electrode layer. The porous electrode layer also may define a perimeter spaced inwardly from the perimeters of the thin electrolyte layer and the ceramic support layer such that the thin electrolyte layer and the ceramic support layer define a sealing perimeter that encapsulates the porous electrode layer. The porous electrode layer may be formed by sintering a fugitive-containing ceramic electrode material in the green state.

In another embodiment, the invention provides a ceramic membrane comprising a thin layer comprising a ceramic electrolyte material in the green state, an intermediate layer supporting the thin electrolyte layer, and a thicker layer supporting the intermediate layer. The support material comprises a ceramic material in the green state and defining a plurality of voids separated by a network of support ribs; the intermediate layer comprises a fugitive-containing electrode material in the green state or a porous electrode material in the green state. The tri-layer assembly is laminated and then sintered to form a composite structure having a porous intermediate layer. The thin electrolyte layer and the support layer each may extend radially outwardly beyond the perimeter of the porous electrode layer to define a sealing perimeter that encapsulates the porous electrode layer. The porous electrode layer also may define a perimeter spaced inwardly from the perimeters of the thin electrolyte layer and the ceramic support layer such that the electrolyte layer and the ceramic support layer define a sealing perimeter that encapsulates the porous electrode layer.

Other embodiments of the invention include electrochemical cells comprising any of the above-described ceramic membranes and a second electrode layer deposited on the thin electrolyte surface. The second electrode layer has a polarity opposite that of the porous or encapsulated electrode.

The invention also provides electrochemical cell stacks that include the above-described electrochemical cells. In one embodiment, the electrochemical cell stack comprises a first dense electronically conductive plate, an electrochemical cell with the first plate adjacent to its support surface and in electrical contact with its porous or encapsulated electrode, a second dense electronically conductive late in electrical contact with the electrode deposited on its thin electrolyte, a second electrochemical cell with the second plate adjacent to its support surface and in electrical contact with its porous or encapsulated electrode, and a third dense electronically conductive plate in electrical contact with the electrode deposited on the second cell's thin electrolyte. At least one dense electronically conductive plate may be nickel chrome superalloy, a ferritic stainless steel, or a lanthanum chromite.

In another embodiment, the electrochemical cell stack comprises n electrochemical cells, as described above, wherein n≧2, and n+1 dense electronically conductive plates. Each of n−1 plates is adjacent to the support of one of the n electrochemical cells and in electrical contact with both the porous or encapsulated electrode of the same cell and the electrode deposited on the thin electrolyte of another one of the n electrochemical cells. Each of the remaining 2 plates is in electrical contact with an outer surface of one of the outermost of the n electrochemical cells.

The invention also provides planar ceramic membrane structures for an electrochemical cell. In one embodiment, the planar ceramic membrane structure comprises a dense electrolyte, a dense mechanical support perforated by a plurality of voids, a porous electrode that defines the active area of the cell, and a dense circumferential region that provides an edge seal to the active area. The porous electrode is encapsulated within the dense electrolyte, dense mechanical support, and dense circumferential region. In another embodiment, the planar ceramic membrane structure comprises a dense electrolyte, a dense mechanical support perforated by a plurality of voids, and a porous electrode material that defines the active area of the cell. The dense electrolyte and dense mechanical support cooperate to encapsulate the porous electrode within the structure and form a dense circumferential region that provides an edge seal to the active area.

BRIEF DESCRIPTION OF THE DRAWINGS

These and further objects of the invention will become apparent from the following detailed description.

DETAILED DESCRIPTION OF CERTAIN PREFERRED EMBODIMENTS

The present invention provides a membrane structure useful in electrochemical cells. When appropriate electrode materials are included in the structure and applied to the exposed electrolyte surface, the structure may form a fuel cell, oxygen separator, or other electrochemical device. The resultant electrochemical cells may be assembled and electrically connected to form stacks.

Figure 1:
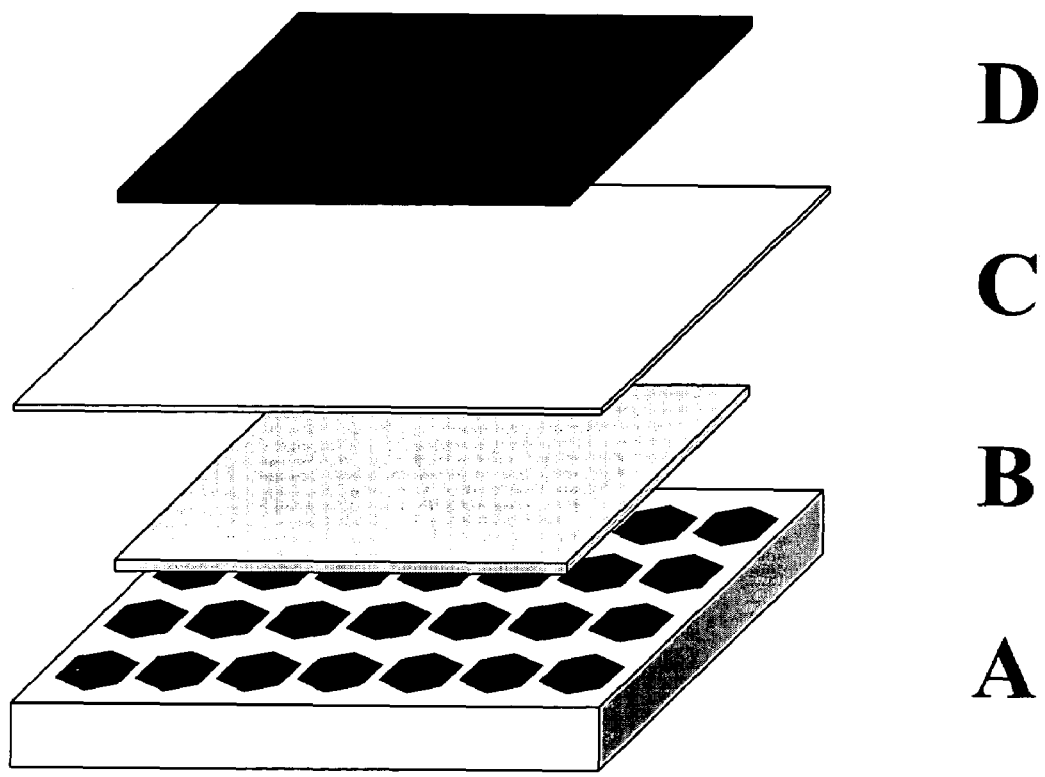
FIG. 1 is an exploded schematic view of an electrochemical cell of the present invention, particularly illustrating the membrane structure.
Figure 2:
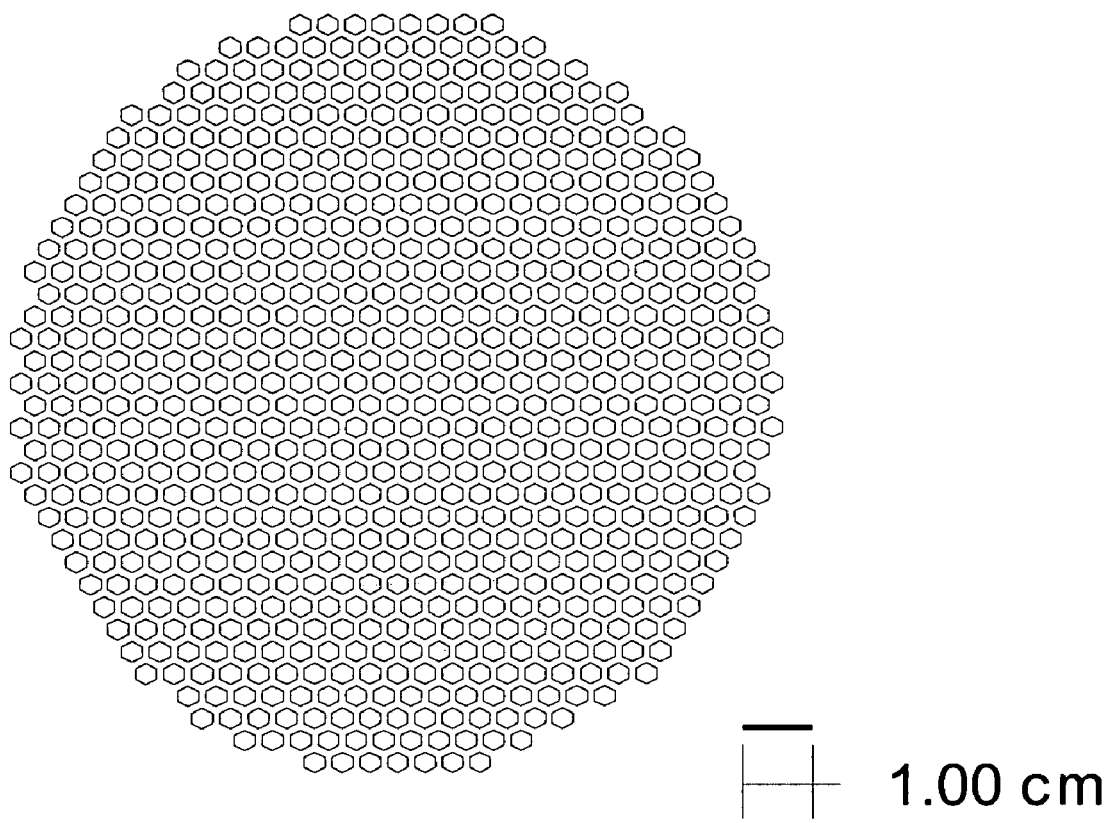
FIG. 2 is a cutting pattern for the support layer of the membrane structure of Example 1.

FIG. 1 shows an exploded schematic view of an electrochemical cell including the membrane structure of the present invention. The membrane structure comprises a mechanical support layer A, a porous electrode layer B, and an electrolyte layer C. An electrode D having a polarity opposite that of electrode layer B may be applied to the electrolyte layer C by screen printing or other conventional methods to form an electrochemical cell. The membrane structure of the present invention yields cells having the advantages of both electrolyte-supported cells (a dense sealing perimeter, high mechanical strength, and thin electrode layers that avoid diffusion limitations) and electrode-supported cells (low ohmic contribution of the electrolyte layer and potential for low temperature operation) without the drawbacks of these conventional designs.

The electrolyte membrane (layer C of FIG. 1) is the thinnest of the three layers, preferably less than 50 microns thick. The porous electrode (layer B of FIG. 1) preferably is less than 100 microns thick. Preferably, the porous electrode layer in the composite structure is less than 70% dense. The green electrode layer may contain pores or the green electrode layer may contain a fugitive material such that pores are formed in the electrode layer after sintering.

The mechanical support layer preferably is a relatively thick (50-250 micron thick) mesh-like component, preferably a ceramic material including but not limited to a ceramic electrolyte material. Preferably, the material of the support layer is cast, cut, or punched to form a mesh pattern. The mesh pattern may be any network providing a desired ratio of exposed to supported area, of any shape or pattern. Examples of mesh patterns are shown in FIGS. 2, 6, 8, and 10, but other patterns also may yield satisfactory results.

A mesh-like pattern of ribs separated by voids is formed in the support layer. The ratio of void area to rib area preferably is ≧60/40. The ribs preferably have a substantially uniform thickness, generally in the range of 30-300 microns. The voids in the structure preferably have a substantially uniform diameter, generally between 0.05 mm and 10 mm, and extend through the thickness of the support layer. The voids may define substantially identical shapes or may vary in size and/or shape across a cell to improve overall void packing density. Preferably, the voids define regular polygons, although voids defining circles and other shapes also may be used. Hexagonal voids are particularly preferred because they reduce the number of stress concentrating angles, achieve a highly equilibrated stress distribution in the plane during sintering and provide a strong support with a high ratio of exposed to supported area. In a preferred embodiment, a cross section of the mesh support layer in a plane parallel to the thin electrolyte layer defines a honeycomb-like structure, shown, e.g., in FIG. 2, which provides excellent access to the dense thin electrolyte layer.

Each layer may comprise one or more sheets of a ceramic, cermet, or metal material in the green state. Any number of sheets may be used to achieve the desired thickness of each electrolyte layer. The use of multiple sheets in the electrolyte layer minimizes the risk of critical continuous defects (e.g., pinholes) through an electrolyte layer, though it makes achieving thin electrolyte layers difficult. The use of multiple sheets in the electrode layer also offers the advantage that sheets of dissimilar compositions can be used to build a composite support layer or functionally grade the electrode to achieve compatibility with a dissimilar electrolyte layer, provide enhanced catalytic or electrochemical function, or other desirable function. The mechanical support layer can be produced in a single layer or by consolidating a number of layers to achieve the desired thickness. Lamination increases the complexity of fabrication, but offers a path to laminar composite approaches, which can provide strength enhancements.

The composition of the three layers may, and likely will, differ. A more important aspect of the composition of the layers is that the shrinkage of the layers upon thermal processing is similar and no deleterious chemical reactions occur between the respective layers. In some cases, for example, it may be preferred to have a mechanically strong, relatively poor conductor in the mechanical support, a highly conductive electron conductor in the porous layer, and a mechanically weaker but excellent ionic conductor in the electrolyte.

Preferably, the thin electrolyte layer and the thicker support layer each is selected from a partially stabilized zirconia composition. The thin electrolyte layer preferably is a scandia-stabilized zirconia composition. Other compositions, including but not limited to doped cerium oxides, doped zirconium oxides, lanthanum gallates, bismuth oxide ceramics, other ionic or mixed conducting ceramics, or mixtures of the above, also may yield satisfactory results. The mechanical support layer preferably is a partially-stabilized zirconia composition, more preferably, a 6 mol % scandia-stabilized zirconia composition or 3 mol % yttria-stabilized composition. Other compositions, including but not limited to doped cerium oxides, dopes zirconium oxides, lanthanum gallates, bismuth oxide ceramics, other ionic or mixed conducting ceramics, metals, cermets or mixtures of the above, also may yield satisfactory results.

The electrode layer may comprise a wide range of materials and composites. In one embodiment, the electrode layer may be formed from a composition suitable for performing the anode function or a fuel cell or other electrochemical cell and conducting current under reducing conditions. Particularly preferred electrodes in this embodiment include NiO-zirconia composites, NiO-ceria composites, other cermets, metals or ceramics with the above-described properties, and combinations thereof. In another embodiment, the electrode layer may be formed from a composition suitable for performing the cathode function for a fuel cell or other electrochemical cell. Particularly preferred electrodes in this embodiment may comprise electronic or mixed electronic-ionic conductors including lanthanide manganites, ferrites, cobaltites or other conducting ceramics, or cermets or metallic materials that can be cosintered in an appropriate manner with the electrolyte or support.

Preferably, the electrode layer in each of the above-described embodiments is porous, with the porosity providing a path for gas diffusion to the electrolyte/electrode interface, a critical region of electrochemical reaction in the resultant electrochemical cell. As described above, this may be accomplished using either a porous electrode layer or a fugitive-containing electrode material in the green state.

The thin electrolyte layer may be prepared by tape casting or other processes that yield a sheet or stack of sheets having a thickness of less than 50 microns after firing. The thin electrolyte layer may comprise a stack of at least two-sheets in the green state. The electrode layer may be prepared by tape casting or other processes that yield a sheet or stack of sheets having a thickness of less than 100 microns after firing, with microscopic porosity in the layer of more than 30% of the fired layer. Like the thin electrolyte layer, the thin electrode layer may comprise a stack of at least two-sheets in the green state.

The mechanical support layer may be produced by punching or cutting green sheets produced by tape casting; by conventional casting methods including but not limited to slip casting or gel casting; by dry or semi-dry pressing using isostatic or uniaxial presses; or by printing the pattern by solid freeform fabrication or similar high solids extrusion processes. It also may be possible to produce voids in the thicker support layer by the burn-off of fugitive materials contained within the support layer. For tape cast sheets, the support layer preferably comprises a single sheet, although two or more sheets (e.g., three and four sheets) also may be used. Multiple sheets may be laminated, e.g., at 80° C. and 12 MPa. The laminated may then be cut using a laser cutting system or similar device to form a network of interconnected ribs separated by voids. This may be accomplished, for example, by cutting the green perform sheet by laser cutting. A pattern, such as the hexagonal pattern shown in FIG. 2, may be cut into the laminate including an uncut perimeter area to allow effective sealing with the thin electrolyte layer and encapsulate the electrode layer. The cut-out laminate may then be set aside.

In one embodiment, the membrane of the present invention may be prepared by laminating the thin electrolyte layer in the green state to the electrode layer and subsequently to the mechanical support layer in the green state. The process is shown schematically in FIG. 3. In Step 1 of FIG. 3, a cross section view of the electrolyte (top), electrode (middle), and mechanical support (bottom) are shown.

Figure 3:
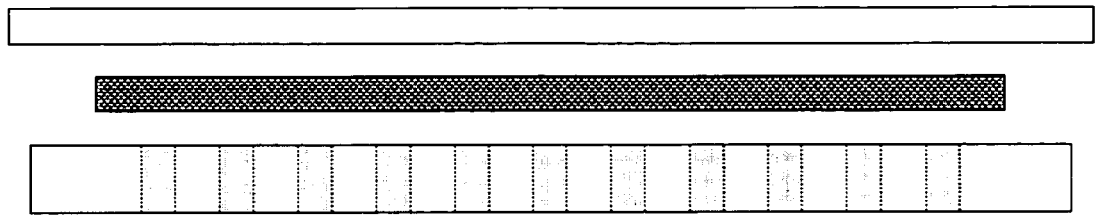
FIG. 3. is an exploded schematic view of the components during various steps in the assembly and processing of one embodiment of the invention, particularly illustrating the cross sectional architecture of the structure and the sequence of layer fabrication.
Figure 3:
Figure 3:
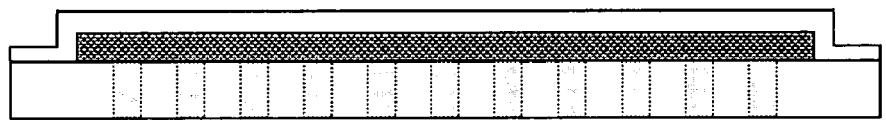
Figure 3:
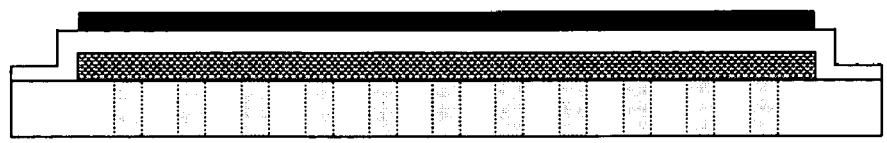

The pieces are laminated by applying isostatic pressure to the stack of tapes, causing the electrolyte layer to deform and encapsulate the electrode layer, as shown in Step 2 of FIG. 3. Although the drawings of FIG. 3 are not to scale, it is important to note that the electrode layer is smaller radially than the electrolyte and mechanical support layers; the thin electrolyte layer and thick ceramic support layers extend radially outwardly beyond the perimeter of the electrode layer such that after lamination, the electrode layer is encapsulated within the thin electrolyte and ceramic support layers and does not extend to the outer surface of the structure. As used herein, "perimeter" refers to the outer edge of a layer, regardless of the shape of the layer. By applying isostatic force to the laminate at temperatures above the glass transition of the tape binder, the electrolyte deforms uniformly, avoiding cracking or unequal stress distributions. Preferably, the portions of the laminated thin electrolyte and ceramic support layers extending beyond the perimeter of the electrode layer form a dense sealing perimeter useful in the assembly of electrochemical cell stacks.

The laminate can then be heat treated to remove the tape casting binders from the laminae, and then sintered to produce a ceramic part with a dense electrolyte layer. During this heat treatment, all the lamina shrink to produce a fired part that is smaller than the green part while maintaining the architecture of the component, as shown in Step 3 of FIG. 3. The sintering of the cell creates a dense ceramic continuum at the perimeter that encapsulates the porous electrode, completely eliminating any lateral gas diffusion paths out of the electrode region. Step 4 of FIG. 3 shows the deposition of the opposite electrode, which completes the electrochemical cell.

The preferred lamination method uses pressure and temperature to bond the two layers by heating above the glass transition temperature of the polymer component of the green support layer to achieve intimate contact and bonding between the layers. The layers typically are compressed at temperatures below 100° C. to produce a laminate structure. After lamination, the laminate may be trimmed using a laser cutter. A pattern, such as that shown in FIG. 2, may be cut out of the laminate, e.g., using a 30-watt laser, leaving a sealing border of between 0.1 and 3 cm around the pattern of shapes. The laminate is then heated to ~600° C. to remove the polymeric binder. The resultant structure is sintered at temperatures above 1000° C. to densify the structure and provide adherence and cohesion layers.

Electrochemical cells may be prepared from the laminate membrane structure of the present invention by applying appropriate electrode materials to the exposed electrolyte surface. This may be accomplished, for example, by screen printing of electrode inks or other conventional electrode application methods. In the case of a cell with an anode layer encapsulated between the electrolyte and the support, the cathode materials should be a composition suitable for performing the cathode function for a fuel cell or other electrochemical cell, such as electronic or mixed electronic-ionic conductors such as the lanthanide manganites, ferrites, cobaltites or other conducting ceramics, or cermets or metallic materials, or mixtures thereof. For a cell with an encapsulated cathode layer, anode materials for the exposed electrolyte surface may be selected from NiO-zirconia composites, NiO-ceria composites, or other cermets, metals or ceramics, or composites thereof suitable for performing the anode function for a fuel cell or other electrochemical cell and conducting current under reducing conditions.

Screen printing is a preferred method of electrode deposition on the exposed electrolyte, although other conventional methods may be used. A typical cathode electrode is prepared by depositing a first layer of an electrochemically active material (such as a lanthanum manganite and gadolinium-doped ceria powder mixture dispersed in an organic vehicle) and then depositing a second ink layer (such a pure lanthanum manganite powder dispersed in an organic vehicle) as a "current collector." After sequentially printing and drying the two layers, the cathode is sintered at a temperature of 1150° C. For anode electrodes, an electrochemically active inter-layer ink (for example a finely divided NiO and a gadolinium-doped ceria powder mixture dispersed in an organic vehicle), will first be deposited and then a second electrically conductive ink layer (for example a more coarsely divided NiO and yttrium-stabilized zirconia powder mixture dispersed in an organic vehicle) would be deposited on top of the interlayer. The second layer serves as a high conductivity "current collector" layer. The layers preferably are deposited by applying the ink formulations by screen printing or other conventional application method, including but not limited to aerosol spray deposition, painting, and stencil or transfer printing processes. After sequentially depositing and drying the two layers, the electrode is sintered to a temperature of 1300° C.

Electrochemical cell stacks may be prepared from the resulting electrochemical cells by interleaving the cells with conventional dense interconnect plates of an electrically conducting material. The dense plates serve to separate air and fuel streams while providing an electrical series connection between the cells. The plates may be formed from a dense material that is conductive in both oxidizing and reducing atmospheres, including but not limited to an electronically conductive dense ceramic material, lanthanum chromite, a nickel chromic superalloy, and a ferritic stainless steel.

An electrochemical stack maybe formed from a minimum of two self-supporting membranes or electrochemical cells and three plates, with the first plate having an inner face adjacent to the support side of the first membrane or cell, the second plate having one face adjacent to the thin electrolyte side of the first membrane or cell and the opposing face adjacent to the support side of the second membrane or cell, and the third plate having an inner face adjacent to the thin electrolyte side of the second membrane or cell. Additional units may be added to the stack with the number of membranes or cells being equal to n and the number of plates being equal to n+1.

A stack may be prepared by connecting the membranes or cells to the plates with a contact paste. The contact paste may penetrate the voids in the support to provide electrical contact between the plates and the encapsulated electrode. The contact paste may comprise a conducting ceramic material such as a lanthanum chromite, a cermet such as NiO/YSZ, or a metal, such as platinum or silver.

The dense seal perimeter allows effective stack sealing with the application of small compressive forces. The flexibility and strength of the membranes structure allows effective flattening of the structure at lower pressure. The conformance required for effective mechanical sealing may be achieved with the external application of a lower mechanical load to the stack.

Examples of membrane structures and electrochemical cells according to the present invention are described below. These examples are intended to illustrate and assist in understating the invention but not to limit the scope of the invention to the described examples.

Example 1

Preparation of Membrane Structure I

The tri-layers were constructed with electrolyte and support tapes prepared with 6 mol % scandium-stabilized zirconia powder (initial SSA=8.704 $m^2$/g). The 6ScSZ tapes for the support structure were prepared by a conventional tape casting method and had a thickness of approximately 45 microns in the green state. The tape was cut into 15×15 cm sheets. The sheets were stacked on top each other, five sheets per stack. The resulting five-sheet stack was laminated at 80° C. and 12 MPa. The pattern shown in FIG. 2 was then cut in the laminate using a laser cutting system. The cut-out laminate was set aside.

Figure 4:
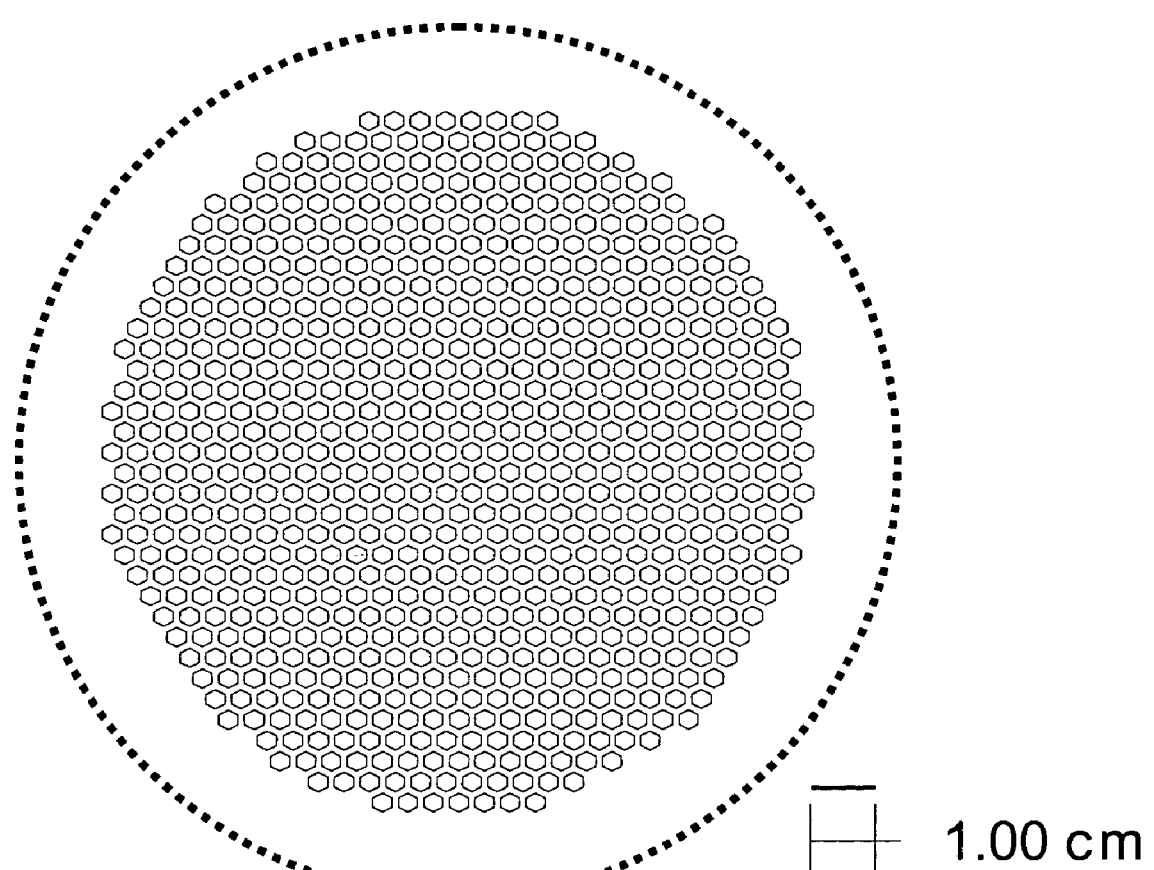
FIG. 4 is the final cutting pattern (dashed line) of the membrane structure of Examples 1.

The porous anode layer was constructed with cast tapes prepared with a nickel oxide and yttria-stabilized zirconia powder mixture. This mixture was made using 60 mol % NiO powder (Novamet) and 40 mol % yttria-stabilized zirconia (Unitec). The thickness of the dry tape was 45 microns. The sheets were then cut by hand to 15 cm×15 cm, moved to a 30-watt laser cutting system, and cut to form a circle with a diameter 0.5 cm greater than the mesh pattern shown in FIG. 4.

The 6ScSZ electrolyte tapes for the thin electrolyte layer were prepared by a conventional tape casting method. The thickness of the electrolyte tape was 45 microns. The tape was cut into 15×15 cm sheets.

Figure 5:
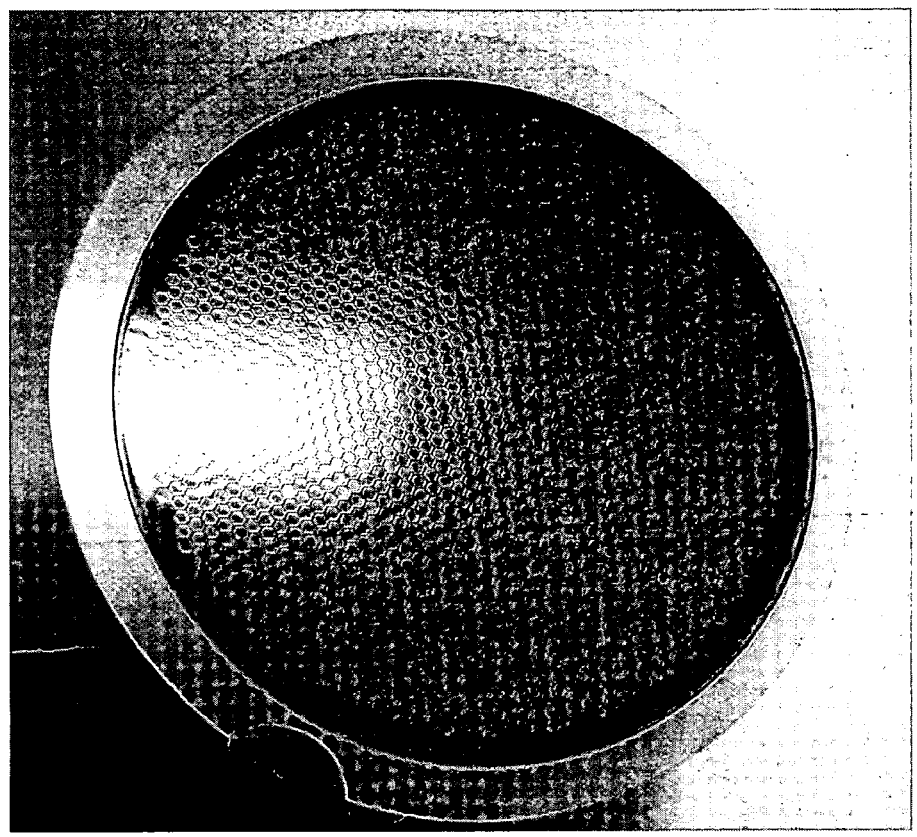
FIG. 5 is a photograph of the composite structure produced after sintering the membrane structure of Example 1.
Figure 6:
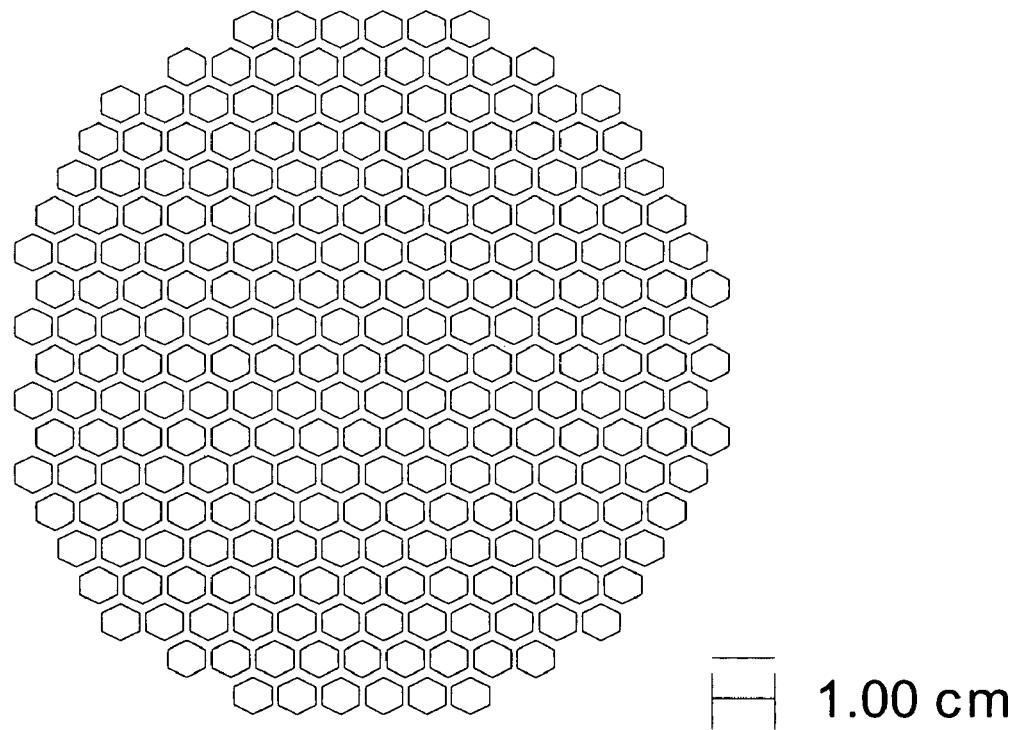
FIG. 6 is a cutting pattern for the support layer of the membrane structure of Example 2.

For lamination of the structure, the electrolyte tape was placed on an aluminum setter covered with Mylar. The anode layer was stacked on the electrolyte layer, centered on the electrolyte sheet. The cut-out support laminate was then placed on top of the anode sheet, again centered to provide a uniform overlap of electrolyte and mechanical support, such that when laminated, the electrode layer would be encapsulated by the overlapping electrolyte and support layers. The stack was laminated at 80° C. and 12 MPa. After lamination, the final part was cut out of the laminate based on the pattern shown by the dashed line in FIG. 4. The resultant component was sintered at 1400° C. for two hours to densify the electrolyte and support layers. A photograph of the resultant component is shown in FIG. 5.

Example 2

Preparation of Membrane Structure II

Figure 7:
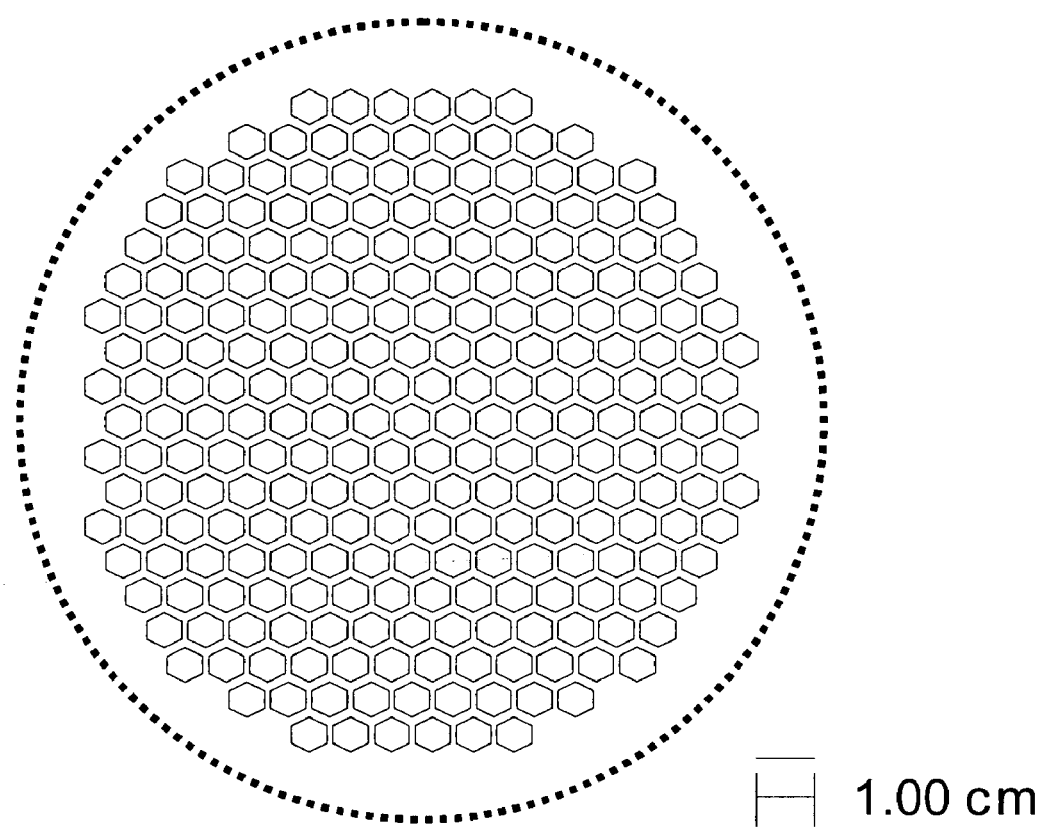
FIG. 7 is the final cutting pattern (dashed line) of the membrane structure of Example 2.
Figure 8:
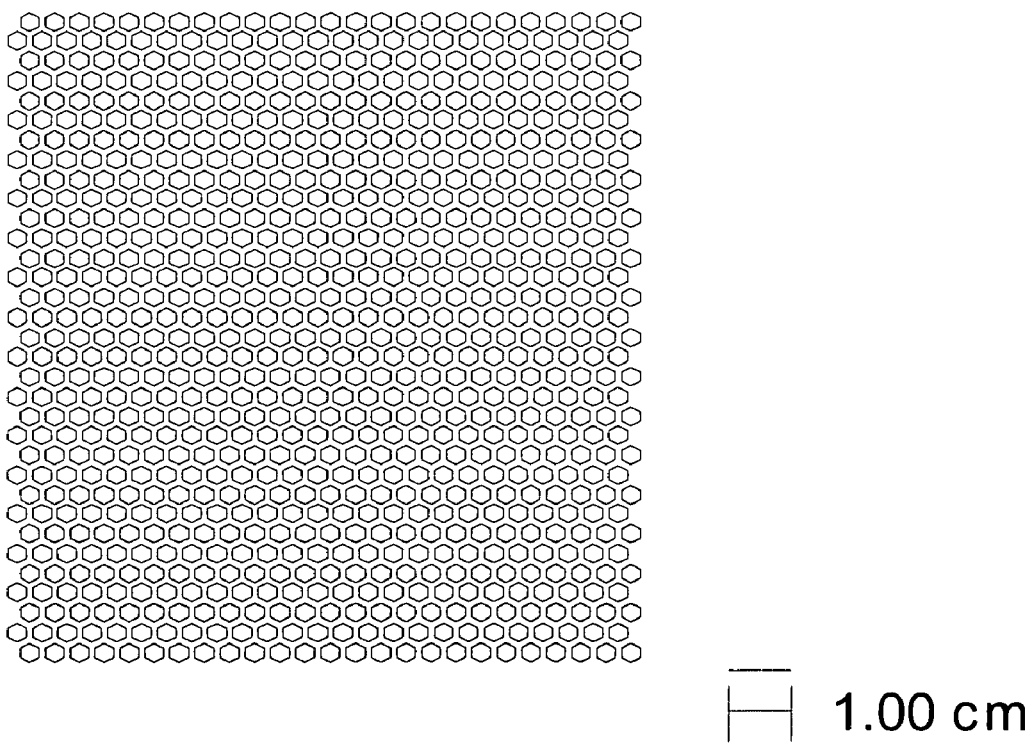
FIG. 8 is a cutting pattern for the support layer of the membrane structure of Example 3.

The tri-layers were prepared, cast and laminated as described in Example 1. The support laminate was laser cut to produce the pattern shown in FIG. 6. The cut-out laminate was set aside. The two-sheet electrolyte-electrode stack was prepared as described in Example 1 and laminated with the cut-out support, also as described in Example 1. The final part was cut out of the laminate using the pattern shown by the dashed line in FIG. 7. The resultant component was sintered at 1400° C. for two hours to densify the electrolyte and support layers.

Example 3

Preparation of Membrane Structure III

Figure 9:
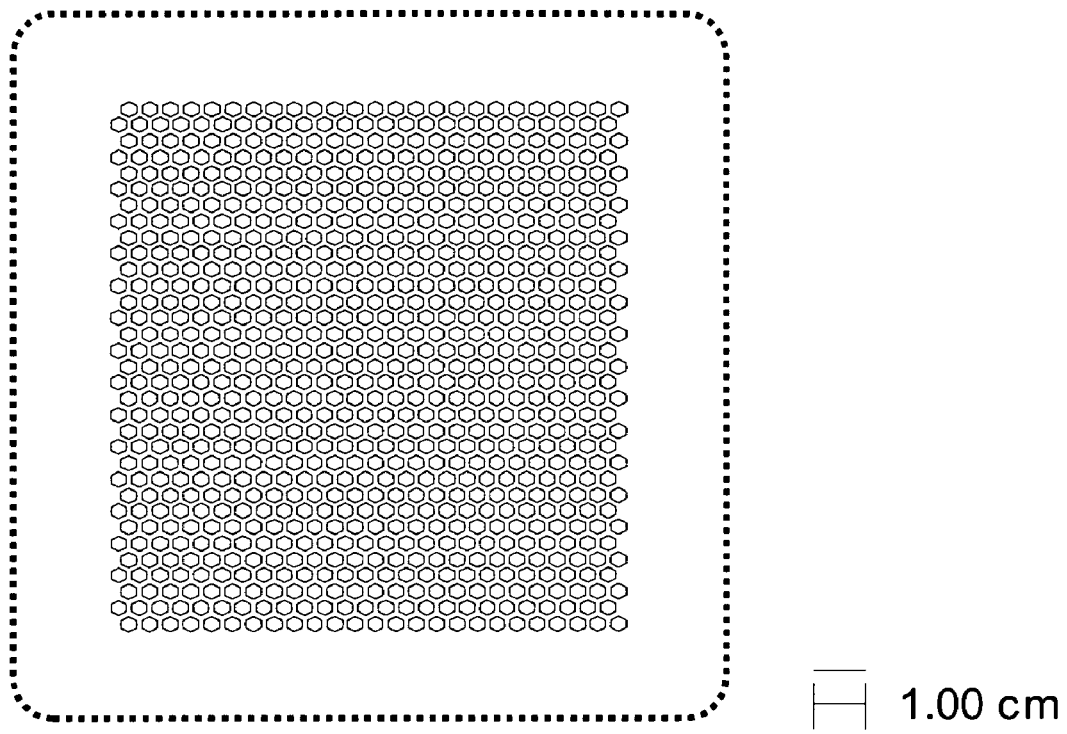
FIG. 9 is the final cutting pattern (dashed line) of the membrane structure of Example 3.
Figure 10:
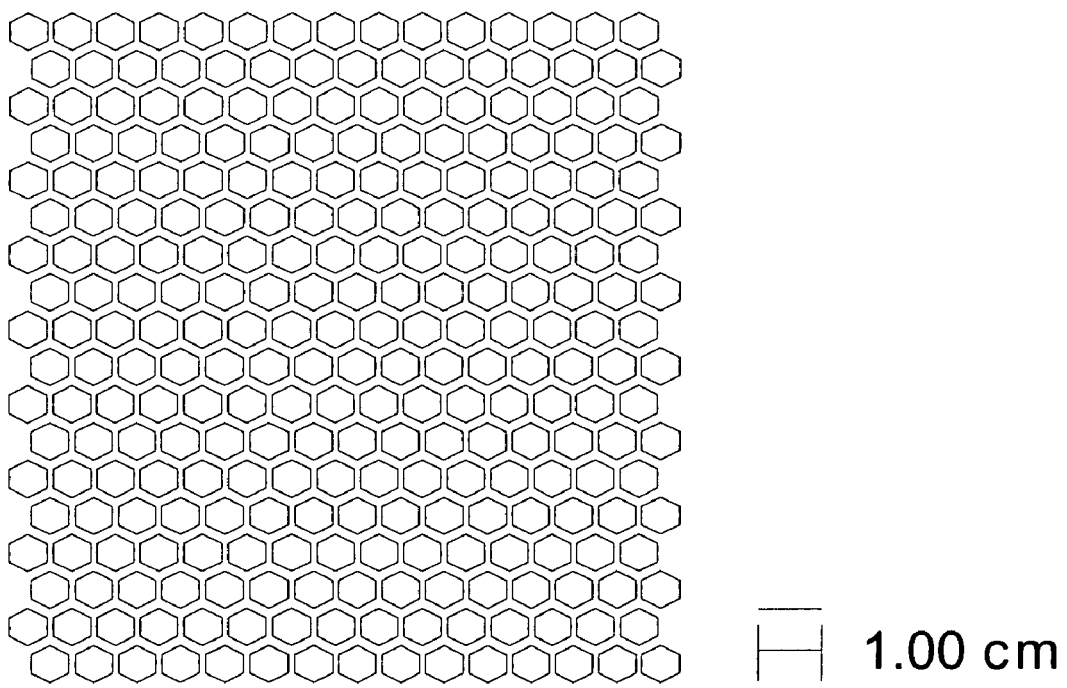
FIG. 10 is a cutting pattern for the support layer of the membrane structure of Example 4.

The tri-layers were prepared, cast and laminated as described in Example 1. The support laminate was laser cut to produce the pattern shown in FIG. 8. The cut-out laminate was set aside. The two-sheet electrolyte-electrode stack was prepared as described in Example 1 and laminated with the cut-out support, also as described in Example 1. The final part was cut out of the laminate using the pattern shown by the dashed line in FIG. 9. The resultant component was sintered at 1400° C. for two hours to densify the electrolyte and support layers.

Example 4

Preparation of Membrane Structure IV

Figure 11:
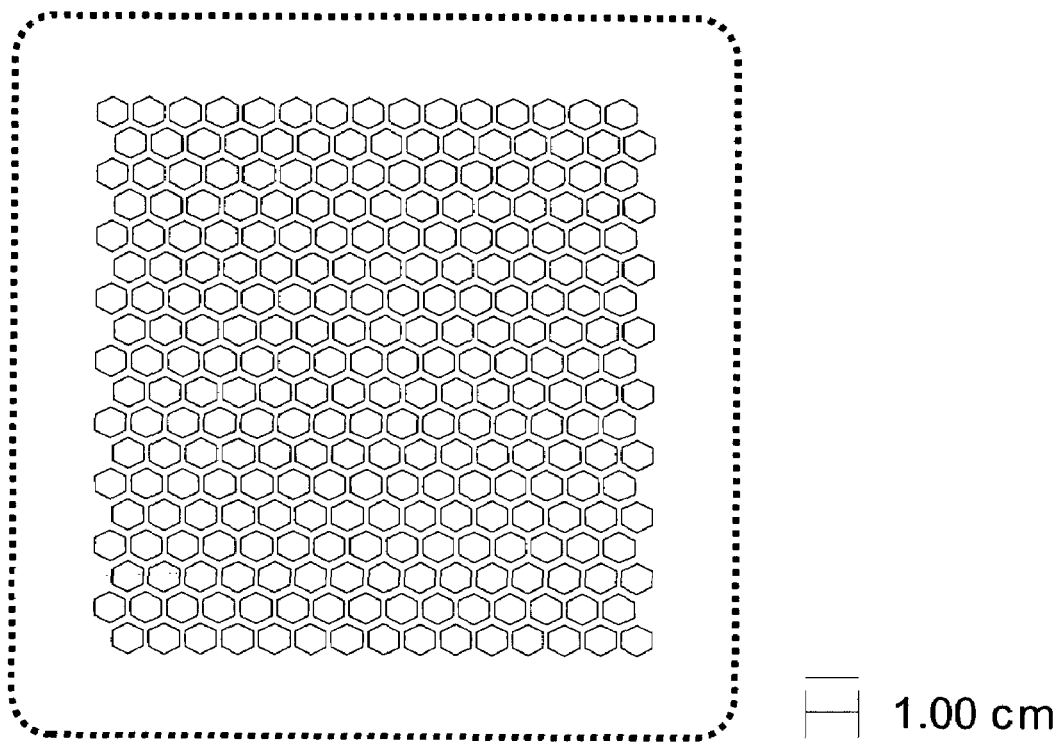
FIG. 11 is the final cutting pattern (dashed line) of the membrane structure of Example 4.
Figure 12:
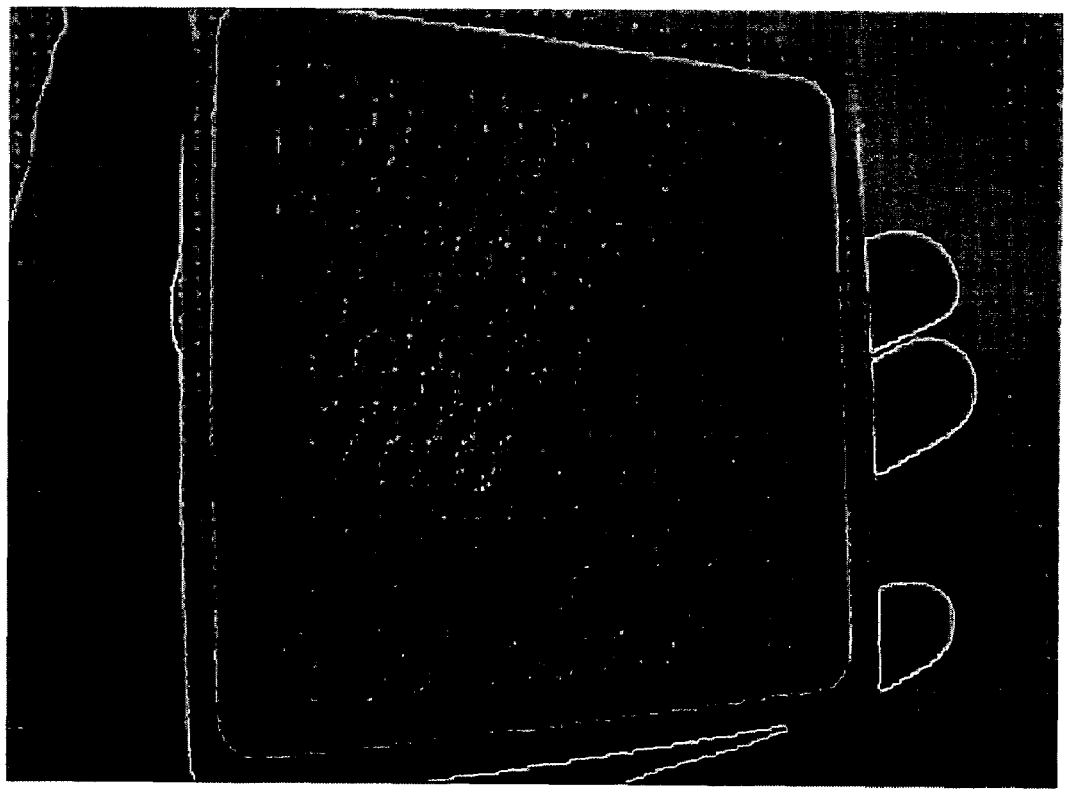
FIG. 12 is a photograph of the composite structure produced after sintering the membrane structure of Example 4.

The tri-layers were prepared, cast and laminated as described in Example 1. The support laminate was laser cut to produce the pattern shown in FIG. 10. The cut-out laminate was set aside. The two-sheet electrolyte-electrode stack was prepared as described in Example 1 and laminated with the cut-out support, also as described in Example 1. The final part was cut out of the laminate using the pattern shown by the solid line in FIG. 11. After sintering at 1400° C. for 2 hours, the component shown in FIG. 12 was produced.

Example 5

Preparation of Membrane Structure IV

Figure 13:
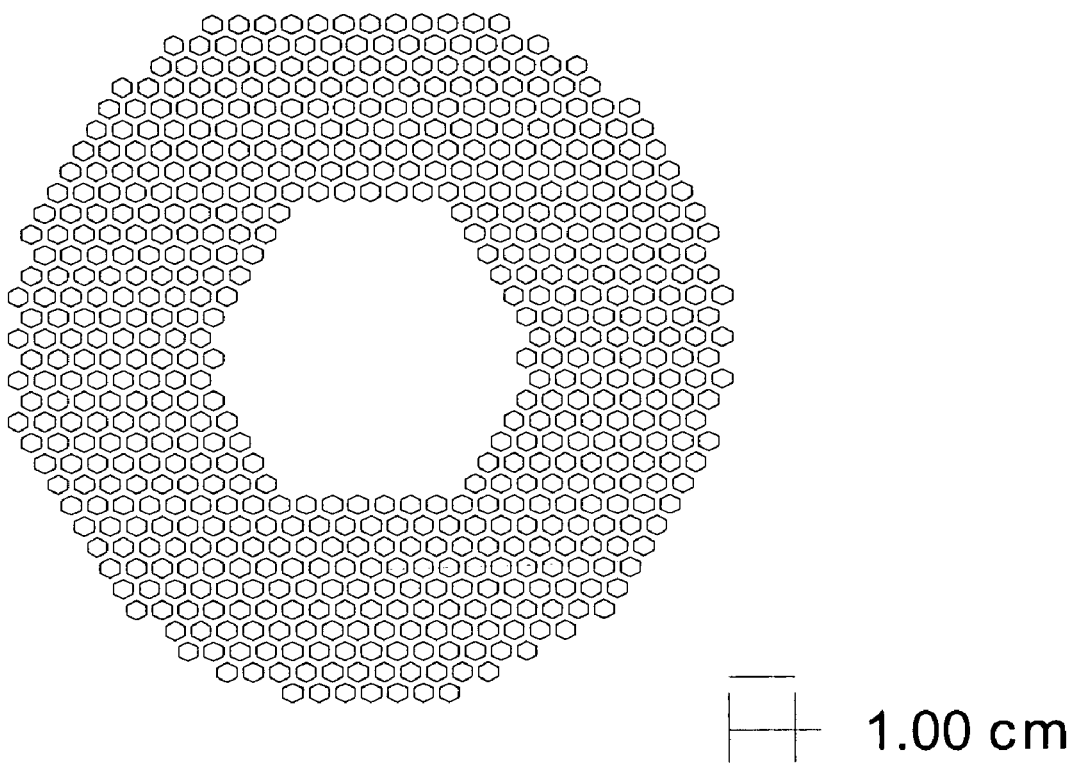
FIG. 13 is the cutting pattern for the support layer of the membrane structure of Example 5.
Figure 14:
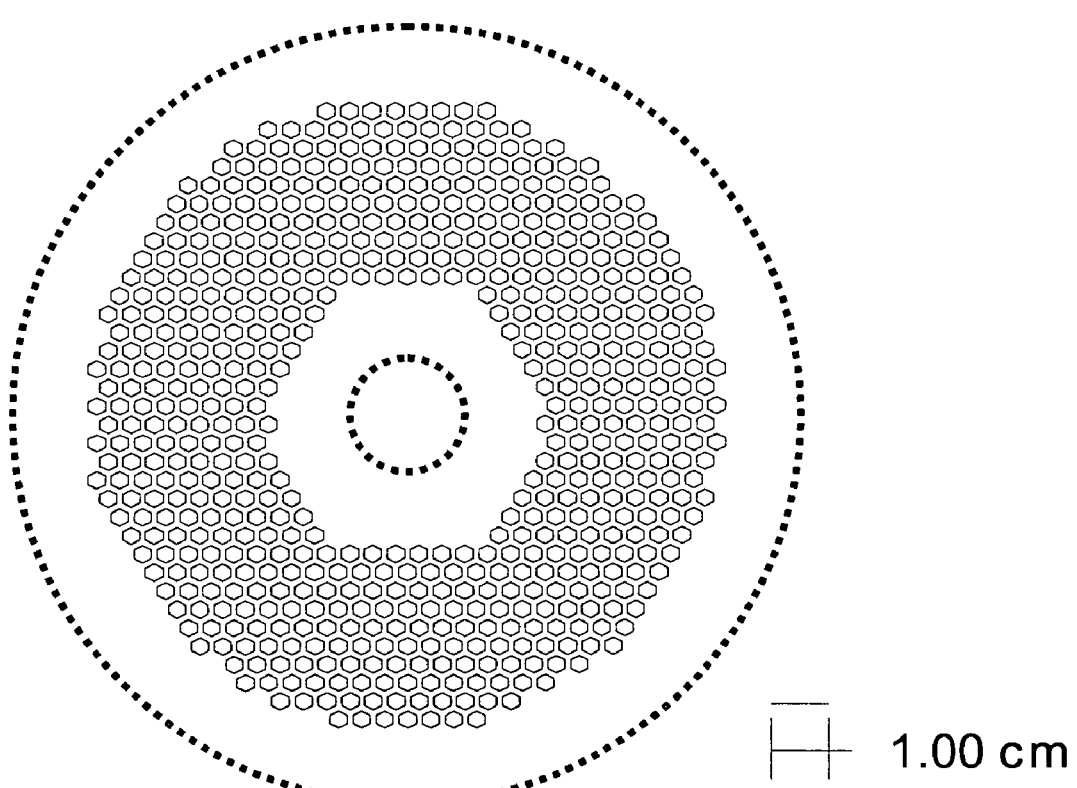
FIG. 14 is the final cutting pattern (dashed line) of the membrane structure of Example 5.

The tri-layers were prepared, cast and laminated as described in Example 1. The support laminate was laser cut to produce the pattern shown in FIG. 13. The cut-out laminate was set aside. The two-sheet electrolyte-electrode stack was prepared as described in Example 1 and laminated with the cut-out support, also as described in Example 1. The final part was cut out of the laminate using the pattern shown by the dashed line in FIG. 14. The resultant component was sintered at 1400° C. for two hours to densify the electrolyte and support layers.

Example 6

Electroding and Testing of Mesh-Supported Cell

A solid oxide fuel cell was prepared using a membrane structure produced as described in Example 1. A Sr-doped lanthanum manganite/Gd-doped ceria composite cathode was applied by paint roller on the exposed electrolyte membrane directly opposite the sintered anode. The cathode was sintered at 1100° C. to achieve good adherence. Platinum meshes were attached to the anode side of the cell using an NiO ink to serve as the anode current collector. Silver mesh was attached to the cathode side of the cell using a Sr-doped lanthanum manganite ink to serve as the cathode current collector. Alumina felt seals were cut to form a perimeter 1.5 cm wide that enclosed the anode and cathode active areas. The alumina felts were saturated with an aqueous slurry of alumina powder to improve the density of the seal material and prevent gas leakage.

The cells was heated to 850° C. under air on the cathode side and nitrogen gas on the anode side. The cell exhibited a high open circuit voltage in $N_2$ and was subsequently reduced by substituting hydrogen for nitrogen in the anode gas stream over a one-hour period. At the end of the reduction process, the cell was initially fed 350 sccm $H_2$ to the anode side and 1.6 slpm air to the cathode side. A measurement of the cell voltage as a function of current density was taken and the data plotted in FIG. 15. The cell was cooled to 750° C. and the voltage measured as a function of current density for various fuel dilutions. The slope of the voltage vs. current density curve was calculated and divided by the active area of the cell to determine the area-specific resistance (ASR) of the cell. The ASR values of the test cell was calculated to be 0.279 ohm-cm$^2$ at 850° C. and 0.420 ohm-cm$^2$ at 750° C.

Figure 15:
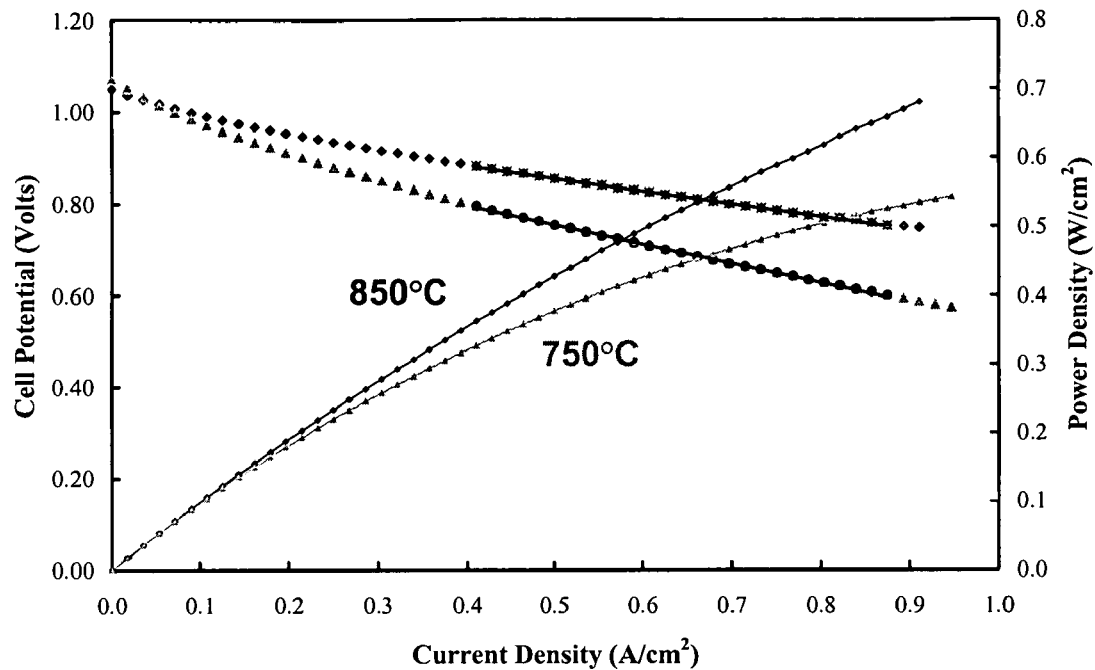
FIG. 15 is a graph of the fuel cell performance of the cell of Example 6 at 850 and 750° C.
Figure 16:
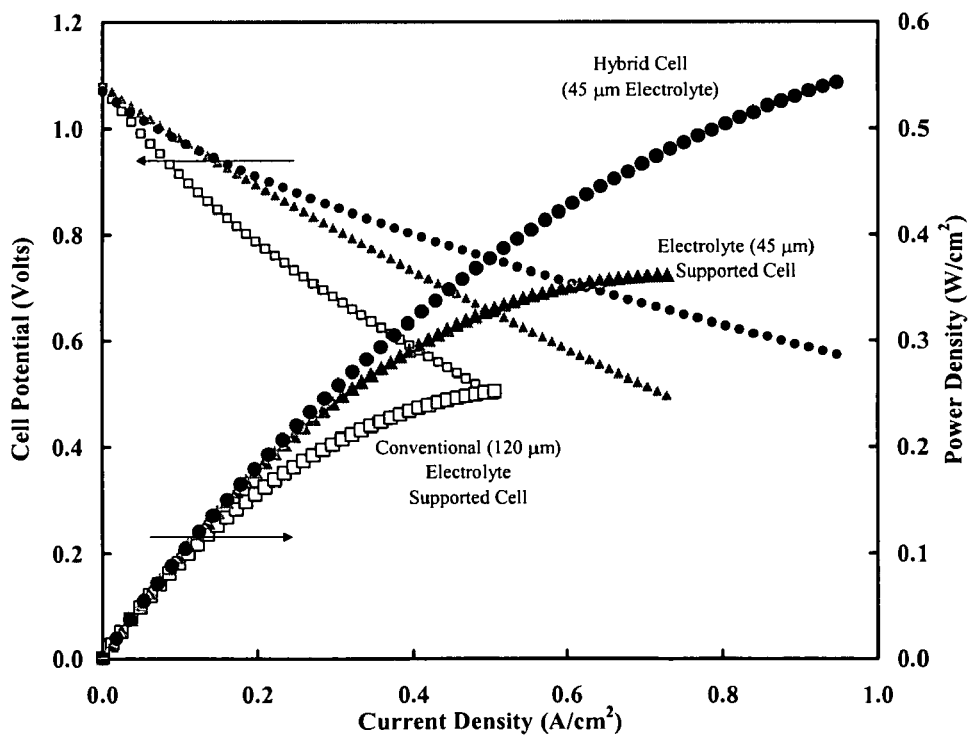
FIG. 16 is a graph of comparative fuel cell performance at 750° C. for the cell of Example 6 and conventional fuel cells.

The impact of the cell structure on performance can be appreciated more clearly in FIG. 16, which shows comparative data of three SOFC components. The three cells had similar electrode compositions and were tested under equivalent fuel utilization and temperature (750° C.) conditions. The primary difference between the samples is the architecture, particularly the thickness of the electrolyte and the intimacy of the electrode-electrolyte interface. As shown in FIG. 15, a conventional electrolyte-supported cell (120 microns thick green tape) has a relatively high ASR value of 1.01 ohm-cm$^2$. The thinner electrolyte-supported cell (45 microns thick green tape) shows improved performance, with an ASR value of 0.753 ohm-cm$^2$. The disclosed architecture with the same electrolyte thickness (45 microns thick green tape) but the most intimate contact between anode and electrolyte, demonstrates the best performance of the three, with an ASR value of 0.421 ohm-cm$^2$. Given that all three cells are flexible with good mechanical strength and dense sealing perimeters, the advantages of the disclosed technology are evident.

The preferred embodiment of this invention can be achieved by many techniques and methods known to persons who are skilled in this field. To those skilled and knowledgeable in the arts to which the present invention pertains, many widely differing embodiments will be suggested by the foregoing without departing from the intent and scope of the present invention. The descriptions and disclosures herein are intended solely for purposes of illustration and should not be construed as limiting the scope of the present invention which is described by the following claims.

What is claimed is:

1. A ceramic membrane, comprising a sintered planar laminate of:
   at least one layer of a ceramic electrolyte material;
   at least one layer of an intermediate porous electrode material positioned adjacent to and supporting the ceramic electrolyte material; and
   at least one layer of a ceramic electrolyte support material positioned adjacent to and supporting the porous electrode material, the ceramic electrolyte support material having a thickness less than 300 μm and comprising a network of support ribs defining a plurality of separated voids,
   wherein the ceramic electrolyte material and the ceramic electrolyte support material each extend outwardly beyond the perimeter of the porous electrode material to define a sealing perimeter that encapsulates the porous electrode material.

2. The supported membrane of claim 1, wherein the ceramic electrolyte material has a thickness less than 50 μm and the porous electrode material has a thickness less than 100 μm.

3. The supported membrane of claim 1, wherein the ceramic electrolyte comprises scandia-stabilized zirconia, doped cerium oxide, doped zirconium oxide, lanthanum gallate, bismuth oxide, or mixtures thereof.

4. An electrochemical cell, comprising:
   the planar ceramic membrane of claim 1; and
   at least one layer of a second porous electrode material deposited on a surface of the ceramic electrolyte material.

5. An electrochemical cell stack, comprising:
   a first dense electronically conductive plate;
   a first electrochemical cell as defined in claim 4, the first electronically conductive plate being positioned adjacent to the ceramic electrolyte support material of the first cell and in electrical contact with the encapsulated porous electrode material of the first cell;
   a second dense electronically conductive plate in electrical contact with the second porous electrode material deposited on the ceramic electrolyte material of the first cell;
   a second electrochemical cell as defined in claim 4, the second electronically conductive plate being positioned adjacent to the ceramic electrolyte support material of the second cell and in electrical contact with the encapsulated porous electrode material of the second cell; and
   a third dense electronically conductive plate in electrical contact with the second porous electrode material deposited on the ceramic electrolyte material of the second cell.

6. The electrochemical cell stack of claim 5, wherein at least one of the first, second or third dense electronically conductive plates comprises a nickel chrome superalloy, a ferritic stainless steel, or a lanthanum chromite.

7. An electrochemical cell stack, comprising:
   n electrochemical cells as defined in claim 4, wherein n≧2; and
   n+1 dense electronically conductive plates;
   wherein each of n−1 plates is adjacent to the ceramic electrolyte support material of one of the n electrochemical cells and in electrical contact with both the encapsulated porous electrode material of the same cell and the second porous electrode material deposited on the ceramic electrolyte material of another one of the n electrochemical cells, and each of the remaining 2 plates is in electrical contact with an outer surface of one of the outermost of the n electrochemical cells.

8. A ceramic membrane, comprising a sintered planar laminate of:
   at least one layer of a ceramic electrolyte material;
   at least one layer of an intermediate porous electrode material positioned adjacent to and supporting the ceramic electrolyte material; and
   at least one layer of a ceramic electrolyte support material positioned adjacent to and supporting the porous electrode material, the ceramic electrolyte support material having a thickness less than 300 μm and comprising a network of support ribs defining a plurality of separated voids;
   wherein the porous electrode material defines a perimeter spaced inwardly from the perimeters of the ceramic electrolyte material and the ceramic electrolyte support material such that the ceramic electrolyte material and the ceramic electrolyte support material define a sealing perimeter that encapsulates the porous electrode material.

9. The supported membrane of claim 8, wherein the ceramic electrolyte material has a thickness less than 50 μm and the porous electrode material has a thickness less than 100 μm.

10. The supported membrane of claim 8, wherein the ceramic electrolyte material comprises scandia-stabilized zirconia, doped cerium oxide, doped zirconium oxide, lanthanum gallate, or mixtures thereof.

11. An electrochemical cell, comprising:
the planar ceramic membrane of claim 8; and
at least one layer of a second porous electrode material deposited on a surface of the ceramic electrolyte material.

12. An electrochemical cell stack, comprising:
a first dense electronically conductive plate;
a first electrochemical cell as defined in claim 11, the first electronically conductive plate being positioned adjacent to the ceramic electrolyte support material of the first cell and in electrical contact with the encapsulated porous electrode material of the first cell;
a second dense electronically conductive plate in electrical contact with the second porous electrode material deposited on the ceramic electrolyte material of the first cell;
a second electrochemical cell as defined in claim 11, the second electronically conductive plate being positioned adjacent to the ceramic electrolyte support material of the second cell and in electrical contact with the encapsulated porous electrode material of the second cell; and
a third dense electronically conductive plate in electrical contact with the second porous electrode material deposited on the ceramic electrolyte material of the second cell.

13. The electrochemical cell stack of claim 12, wherein at least one of the first, second or third dense electronically conductive plates comprises a nickel chrome superalloy, a ferritic stainless steel, or a lanthanum chromite.

14. An electrochemical cell stack, comprising:
n electrochemical cells as defined in claim 11, wherein $n \geq 2$; and
n+1 dense electronically conductive plates;
wherein each of n−1 plates is adjacent to the ceramic electrolyte support material of one of the n electrochemical cells and in electrical contact with both the encapsulated porous electrode material of the same cell and the second porous electrode material deposited on the ceramic electrolyte material of another one of the n electrochemical cells, and each of the remaining 2 plates is in electrical contact with an outer surface of one of the outermost of the n electrochemical cells.

15. A ceramic membrane for an electrochemical cell, comprising a planar sintered laminate of:
a ceramic electrolyte material;
an intermediate porous electrode material positioned above the ceramic electrolyte material and defining an active area; and
a ceramic electrolyte support material positioned above and supporting the porous electrode material, the ceramic electrolyte support material having a thickness less than 300 μm and a plurality of voids configured to provide a path for gas diffusion to the active area,
wherein the ceramic electrolyte material and the ceramic electrolyte support material each extend outwardly beyond the perimeter of the porous electrode material to define a sealing perimeter that encapsulates the porous electrode material.

16. An electrochemical cell, comprising:
the planar ceramic membrane of claim 15; and
at least one layer of a second porous electrode material deposited on a surface of the ceramic electrolyte material.

17. A ceramic membrane for an electrochemical cell, comprising a planar sintered laminate of:
a ceramic electrolyte material;
an intermediate porous electrode material positioned above the ceramic electrolyte material and defining an active area; and
a ceramic electrolyte support material that includes a top surface and a bottom surface and is positioned above and supporting the porous electrode material, the ceramic electrolyte support material having a thickness less than 300 μm and a plurality of voids that extend from the top surface to the bottom surface and are configured to provide a path for gas diffusion to the active area,
wherein the ceramic electrolyte material and the ceramic electrolyte support material each extend outwardly beyond the perimeter of the porous electrode material to define a sealing perimeter that encapsulates the porous electrode material.

18. An electrochemical cell, comprising:
the planar ceramic membrane of claim 17; and
at least one layer of a second porous electrode material deposited on a surface of the ceramic electrolyte material.

* * * * *

UNITED STATES PATENT AND TRADEMARK OFFICE
CERTIFICATE OF CORRECTION

| | |
|---|---|
| PATENT NO. | : 7,736,787 B2 |
| APPLICATION NO. | : 11/220361 |
| DATED | : June 15, 2010 |
| INVENTOR(S) | : Michael J. Day et al. |

Page 1 of 1

It is certified that error appears in the above-identified patent and that said Letters Patent is hereby corrected as shown below:

Column 15, Line 40, change "$n \geqq 2$" to --$n \geq 2$--.

Signed and Sealed this

Nineteenth Day of October, 2010

David J. Kappos
*Director of the United States Patent and Trademark Office*